(12) United States Patent
Patel et al.

(10) Patent No.: US 7,158,279 B2
(45) Date of Patent: Jan. 2, 2007

(54) SPATIAL LIGHT MODULATORS WITH NON-UNIFORM PIXELS

(75) Inventors: Satyadev Patel, Sunnyvale, CA (US); Regis Grasser, Mountain View, CA (US); Andrew Huibers, Palo Alto, CA (US); Peter Heureux, Felton, CA (US)

(73) Assignee: Texas Instruments Incorporated, Dallas, TX (US)

( * ) Notice: Subject to any disclaimer, the term of this patent is extended or adjusted under 35 U.S.C. 154(b) by 92 days.

(21) Appl. No.: 10/969,503

(22) Filed: Oct. 19, 2004

(65) Prior Publication Data
US 2006/0082856 A1    Apr. 20, 2006

(51) Int. Cl.
G02B 26/00    (2006.01)
G02B 26/08    (2006.01)

(52) U.S. Cl. .............. 359/290; 359/291; 359/298; 359/224

(58) Field of Classification Search ........ 359/290–292, 359/295, 298, 224, 226; 345/690, 694, 697, 345/84; 257/436, 443; 438/7, 14, 104
See application file for complete search history.

(56) References Cited

U.S. PATENT DOCUMENTS

| | | | |
|---|---|---|---|
| 4,566,935 A | 1/1986 | Hornbeck | |
| 4,710,732 A | 12/1987 | Hornbeck | |
| 4,954,789 A | 9/1990 | Sampsell | |
| 4,956,619 A | 9/1990 | Hornbeck | |
| 5,061,049 A | 10/1991 | Hornbeck | |
| 5,216,537 A | 6/1993 | Hornbeck | |
| 5,311,360 A | 5/1994 | Bloom et al. | |
| 5,442,414 A | 8/1995 | Janssen et al. | |
| 5,444,566 A | 8/1995 | Gale et al. | |
| 5,535,047 A | 7/1996 | Hornbeck | |
| 5,567,334 A | 10/1996 | Baker et al. | |
| 5,579,151 A | 11/1996 | Cho | |
| 5,583,688 A | 12/1996 | Hornbeck | |
| 5,631,782 A | 5/1997 | Smith et al. | |
| 5,808,780 A | 9/1998 | McDonald | |
| 6,028,690 A | 2/2000 | Carter et al. | 359/224 |
| 6,046,840 A | 4/2000 | Huibers | |
| 6,053,617 A | 4/2000 | Kaeriyama | |
| 6,107,115 A | 8/2000 | Atobe et al. | |
| 6,337,760 B1 | 1/2002 | Huibers et al. | |
| 6,356,378 B1 | 3/2002 | Huibers | |
| 6,377,233 B1 | 4/2002 | Colgan et al. | |
| 6,381,381 B1 | 4/2002 | Takeda et al. | 385/16 |
| 6,650,461 B1 | 11/2003 | Atobe et al. | |
| 6,747,416 B1* | 6/2004 | Barger et al. | 315/169.3 |
| 6,862,108 B1* | 3/2005 | Kito | 358/1.2 |
| 6,870,554 B1* | 3/2005 | Jain | 345/697 |
| 7,012,942 B1* | 3/2006 | Kahen et al. | 372/39 |
| 7,027,205 B1* | 4/2006 | Richards | 359/291 |
| 2003/0054588 A1 | 3/2003 | Patel et al. | |
| 2003/0156261 A1 | 8/2003 | Huffman et al. | |
| 2004/0130561 A1 | 7/2004 | Jain | |

* cited by examiner

*Primary Examiner*—Loha Ben
(74) *Attorney, Agent, or Firm*—W. James Brady, III; Frederick J. Telecky, Jr.

(57) ABSTRACT

A micromirror array comprises micromirrors of different properties for use particularly in display systems. Micromirrors of different properties can be arranged within the micromirror array according to a predetermined pattern, or randomly. However, it is advantageous to arrange the micromirrors with different properties within the micromirror array neither in complete order nor complete in random.

53 Claims, 4 Drawing Sheets

SPATIAL LIGHT MODULATORS WITH NON-UNIFORM PIXELS

TECHNICAL FIELD OF THE INVENTION

The present invention is generally related to the art of spatial light modulators, and more particularly, to spatial light modulators with inhomogeneous pixels for use in display systems.

BACKGROUND OF THE INVENTION

A typical spatial light modulator in the art for use in display systems has an array of identical pixels. These pixels can be LED, OLED, LCD, Plasma, LCOS, micromirror, or other type of d pixels. In operation, the pixels are individually addressed and switched between operation states such as the ON and OFF state. In different states, incident light is directed in different directions, in the ON state producing desired illumination patterns on a display target (or for direct view).

As a way of example, a spatial light modulator may consist of an array of micromirror devices. Each micromirror device may have a deflectable reflective mirror plate formed on a substrate. An electrode is disposed at a location proximate to the mirror plate such that an electrostatic field can be established therebetween, and an electrostatic force derived from the electrostatic field can have sufficient strength to switch the mirror plate between the ON and OFF states. In the ON state, the mirror plate reflects the incident light onto a display target and produces a "bright" image pixel thereon. In the OFF state, the mirror plate reflects the incident light away from the display target and produces a "dark" pixel. By coordinating the reflective status of the micromirrors in the array, the micromirrors in the array collectively produce the desired image in the display target.

For a micromirror array of high uniformity, a monochromatic coherent light source, such as an arc lamp which is generally used in most current display systems may produce a diffraction pattern which conveys information regarding the underlying periodicity of the micromirror array. This undesired diffraction pattern overlaps with the displayed images, and can be perceived by viewers, resulting in an unpleasant visual effect.

SUMMARY OF THE INVENTION

In view of the foregoing, a spatial light modulator having inhomogeneous pixels is provided herein. Specifically, the pixels of pixel array in the spatial light modulator are different in one or more aspects, including but not limited to structural configuration, material, and properties such as mechanical, electrical, and optical properties. When arranged into an array, the characteristic parameters, such as gaps between adjacent pixels, and pitches each being defined as the center-to-center distance between adjacent pixels may vary across the pixel array. These variations in either individual pixels or the pixel array, however, instead of resulting in impact on the desired performance, may improve the performance, quality, and robustness of the spatial light modulator. In particular, changing the underlying periodicity allows you to control the diffraction pattern and potentially affect the contrast ratio. For example, phase-coherency that may occur from homogeneous pixels arranged in an array can be broken. Unexpected artificial effects arose from the phase-coherency can thus be avoided. Objects and advantages will be obvious and will, in part, appear hereinafter and will be accomplished by the present invention. Such objects of the invention are achieved in the features of the independent claims attached hereto. Preferred embodiments are characterized in the dependent claims.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

In the following, the present invention will be discussed in examples, wherein the pixels of the spatial light modulator are micromirrors each of which comprises a reflective deflectable mirror plate. It will be appreciated by those skilled in the art that the following discussion is for demonstration purposes only, and should not be interpreted as a limitation. Instead, the present invention is applicable to other types of pixels, such as plasma cells in plasma displays, CCD arrays, and LCOS and LCD displays.

Figure 1:
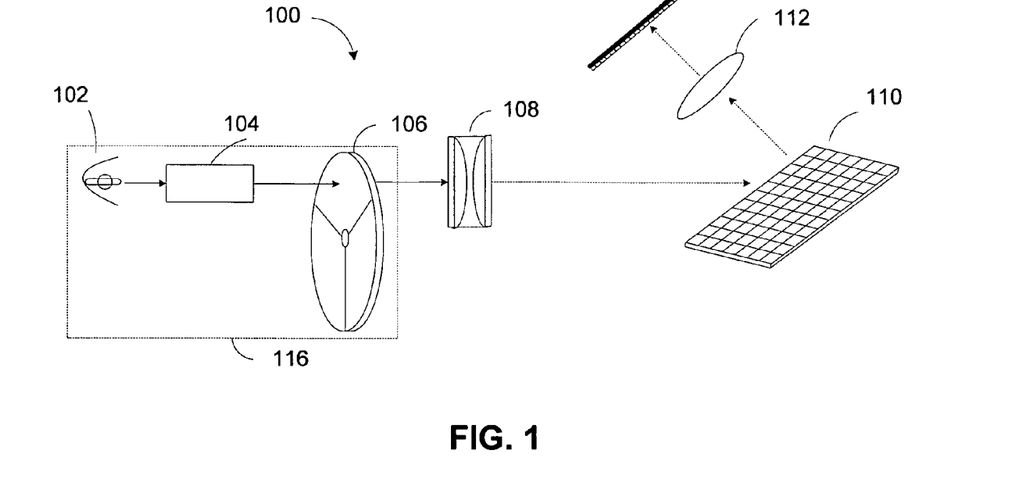
FIG. 1 illustrates an exemplary display system having a spatial light modulator in which embodiments of the invention can be implemented.

Turning to the drawings, FIG. 1 illustrates an exemplary display system employing a spatial light modulator in which embodiments of the present invention can be implemented. In its basic configuration, display system 100 comprises illumination system 116, optical elements 108 and 112, spatial light modulator 110, controller 111, and display target 114.

The illumination system provides primary color light beams that are sequentially incident on the spatial light modulator. In an exemplary configuration, the illumination system light source 102, which can be an arc lamp, lightpipe 104 that can be any suitable integrator of light or light beam shape changer, and color filter 106, which can be a color wheel. In this particular configuration, the color wheel is positioned after the light source and lightpipe on the propagation path of the illumination light from the light source. Of course, other optical configurations can also be used, such as placing the color wheel between the light source and the lightpipe. Optical element 108, which can be a condensing lens, directs the primary color light onto the spatial light modulator in which the primary color light is reflected either into or away from projection lens 112 so as to generate a desired image pattern in the display target. The set of primary colors can comprise any set of three or more colors used to render the output image.

For modulating the illumination light so as to produce desired images on the display target, spatial light modulator 110 in FIG. 1 generally comprises hundreds of thousands, or more than a million, such as millions of pixels, the total number of which determines the resolution of the displayed images. For example, the spatial light modulator may comprise 1024×1768, or 1280×1024, or 1600×1024 or even larger numbers of pixels. Of course, the spatial light modulator may have fewer pixels.

Figure 2:
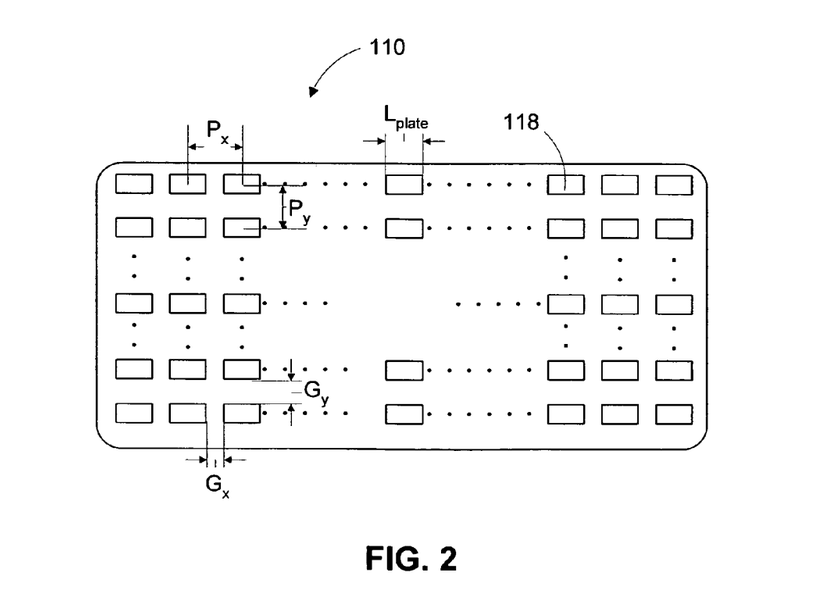
FIG. 2 demonstratively illustrates top view of the spatial light modulator in FIG. 1.

FIG. 2 schematically illustrates a top view of spatial light modulator 110. The structure of the pixel array can be characterized by pixel sizes $L_{plate}$, pixel pitches $P_x$ and $P_y$, and pixel gaps $G_x$ and $G_y$. The pixel pitch measures the center-to-center distance between two adjacent pixels along a particular direction. For example, $P_x$ is the pixel pitch along the rows of the array, while $P_y$ is the pixel pitch along the columns of the pixel array. The gap is defined as the shortest distance between two adjacent pixels along a particular direction. Specifically, $G_x$ is the distance along the rows of the array between two adjacent pixels, while $G_y$ is the distance along the columns of the array between two adjacent pixels.

In accordance with an embodiment of the invention, the pixel pitches of the pixel array are not uniform across the pixel array. For example, the pixel array may have a firs subset of pixels and a second subset of pixels that are arranged in different pitches. As a way of example, the pitch of the pixels of a subset can be from 4.38 to 10.6 microns; or from 5 to 9 microns; or from 6 to 8 microns, as set forth in U.S. patent application Ser. No. 10/627,302 now U.S. Pat. No. 6,965,468, and Ser. No. 10/627,155, now U.S. Pat. No. 7,019,376, both to Huibers and filed Jul. 24, 2003, the subject matter of each being incorporated herein by reference. The pitch of the pixel subset may also have other values, such as values higher than 10.6 microns. The pitch of another pixel subset of the array is different but may also be within the above range.

The pixel subsets of different a pitches can be arranged within the pixel array in many different ways. For example, pixels subsets of different pixel subsets can be interleaved within the pixel array, and the number of pitches of the same value between two consecutive pitches of another value along a particular direction (e.g. along the rows or columns or a diagonal of the pixel array) can be pre-determined (e.g. according to a pre-determined pattern) or random. The pixel subsets of different pixel pitches can also be positioned in the pixel array at different locations but without interleaving. For example, pixels of the array in particular locations (e.g. in the vicinity of the center of the array) may have a different pitch size than other pixels in the array. Of course, the pixel array may have more than two pixel subsets with different pitches.

The pixel pitch may also be different in directions. For example, the pitches can be uniform along the rows and/or columns of the pixel array, but are different in different directions. For example, the pixels in the array may have a uniform pitch along the rows, or columns or any well-defined directions, such as the diagonals of the pixel array. However, the pitch in one direction (e.g. along the rows of the array) is different from the pitches in other directions (e.g. along the columns or diagonals).

As another example of the invention, the pixels can be arranged in the pixel array such that, in terms of the pitches, the pixel array has long-range pitch order but without short-range pitch order. Specifically, the pixel array may have a plurality of pixel subsets, the pixels within each of which can be arranged either randomly or in order (e.g. based on a well-defined pitch). These pixel subsets, however, are regularly positioned in the entire pixel array, that is these pixel subsets are periodically and uniformly arranged within the pixel array, and the period of these pixel subsets (with such period being defined as a center to center distance between adjacent pixel subsets in a particular direction) is uniform across the entire pixel array.

In addition to pixel pitch, pixel gaps (e.g. $G_x$ and/or $G_y$) may also vary independently across the pixel array. The pixel gaps may vary in the same way as the pixel pitch does as discussed above, which will not be discussed in detail for simplicity. The gaps, however, may also vary in different ways especially when the pixels are different. For example, the gaps between adjacent pixels along one direction (e.g. along the rows or columns or diagonals) of the pixel array may vary due to differences (e.g. the pixel size) in the pixels, and the pitches may or may not be the same. Specifically, the gap in one direction (e.g. along the rows of the pixel array) can be smaller than the gap in another direction (e.g. along the columns of the array).

The individual pixels of the pixel array may be different in many ways in addition to the pixel size. Specifically, aspects of a pixel may differ from those of another micromirror in the array in one or more of the following ways: physical properties (i.e. size, shape, material); electromechanical properties (i.e. reflectivity, ON/OFF state angles); and/or physical position (i.e. gap, pitch, vertical position). As a way of example, embodiments of the invention will be discussed with reference to a micromirror array in the following. It will be appreciated by those skilled in the art that the following discussion is for demonstration purposes, and should not be interpreted as a limitation. In fact, other variations of the embodiments without departing from the spirit of the invention are also applicable.

Figure 3:
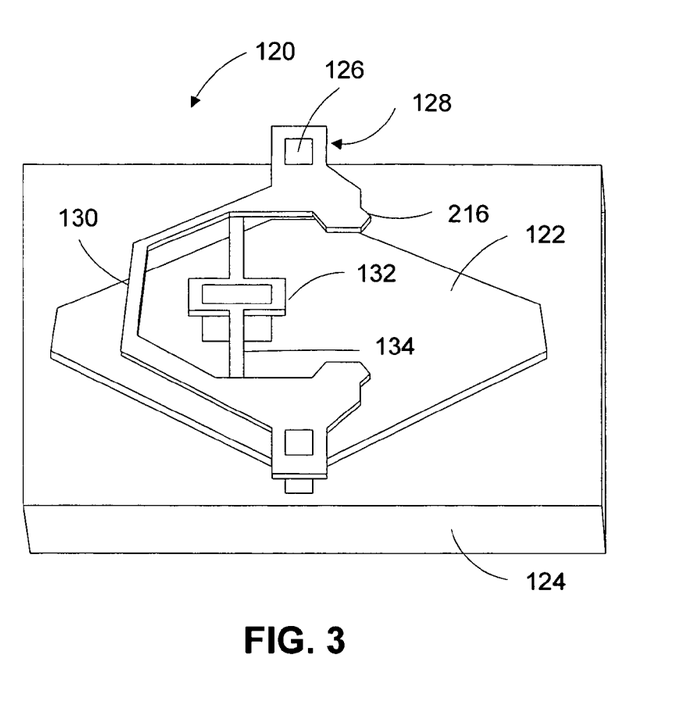
FIG. 3 illustrates an exemplary micromirror of the spatial light modulator in FIG. 2 according to an embodiment of the invention.

FIG. 3 illustrates therein an exemplary micromirror of a micromirror array. In this particular example, micromirror 120 comprises deflectable reflective mirror plate 122 that is attached to deformable hinge 134 via hinge contact 132. The deformable hinge is held by hinge support 130 that is connected to light transmissive substrate 124 via posts 126.

It can be seen in the figure that the mirror plate and deformable are at different planes parallel to the substrate when the mirror plate is not deflected. The mirror plate is attached to the deformable hinge via the hinge contact that is not at the center of the mirror plate. In this way, the rotation axis of the mirror plate is parallel to but offset from a diagonal of the mirror plate; and the mirror is thus operable to rotate asymmetrically. That is, the mirror plate can rotate to a large angle in one direction than the angle in the opposition direction. Alternatively, the mirror plate can be attached to the deformable hinge such that the mirror plate rotates symmetrically.

Figure 4:
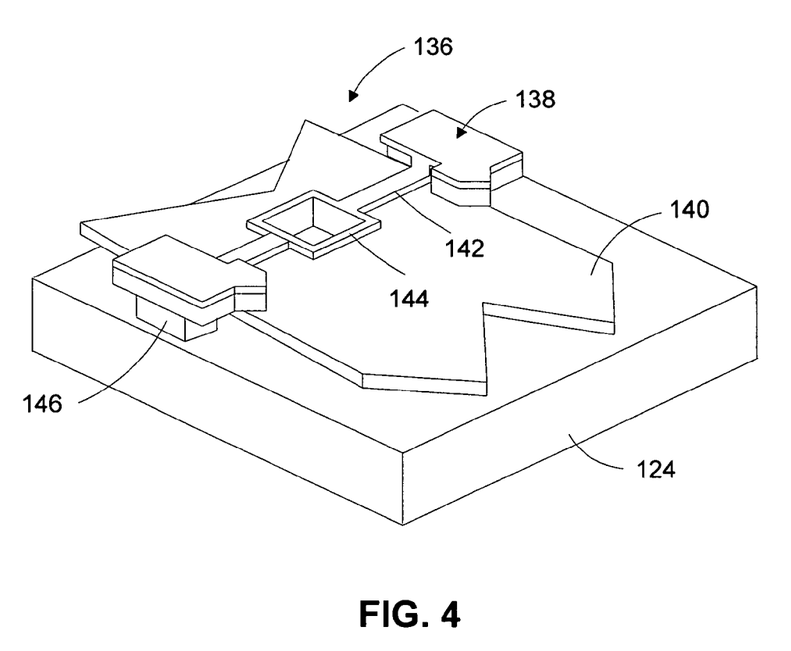
FIG. 4 illustrates another exemplary micromirror of the spatial light modulator in FIG. 2 according to another embodiment of the invention.

FIG. 4 illustrates therein another exemplary micromirror of a micromirror array. Different from micromirror 120 in FIG. 3, mirror plate 140 has zigzag edges for reducing undesired light scattering so as to improve contrast ratio. The mirror plate is attached to deformable hinge 142 via hinge contact 144. The hinge contact may or may not be disposed at the center of the mirror plate. The hinge in this example is held by posts 138 formed on light transmissive substrate 124. Of course, the mirrors in FIGS. 3 and 4 are only two specific examples among many possibilities.

In the above examples, the micromirrors are formed on substrates that are transmissive to visible light. Alternatively, the micromirrors can be formed on other type of substrates, such as semiconductor substrates on which electrodes and circuitry for deflecting the mirror plates of the micromirrors can be formed. In another example, the micromirror substrate can be formed on a transfer substrate that is light transmissive. Specifically, the micromirror plate can be formed on the transfer substrate and then the micromirror substrate along with the transfer substrate is attached to another substrate such as a light transmissive substrate followed by removal of the transfer substrate and patterning of the micromirror substrate to form the micromirror.

Figure 5:
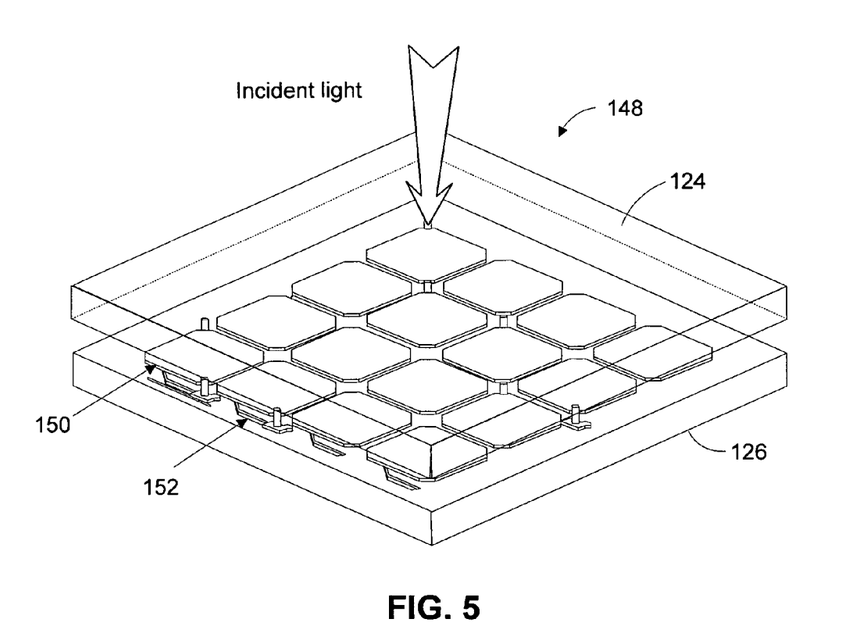
FIG. 5 illustrates a perspective view of a portion of a micromirror array of the spatial light modulator in FIG. 2.

FIG. 5 illustrates therein a portion of a spatial light modulator having an array of micromirrors of FIG. 3. Spatial light modulator 148 comprises micromirror array 150 and electrode and circuitry array 152 for addressing and deflecting the micromirrors in the micromirror array. The micromirror array and electrode and circuitry array are respectively formed on substrates 124 and 126. Alternatively, the micromirror array and electrode and circuitry array can be formed on the same substrate, such as substrate 126 on which standard integrated circuits can be fabricated. In operation, incident light is preferably directed along a direction whose projection on the plane of the micromirror array is along a diagonal of the micromirror array.

Figure 6:
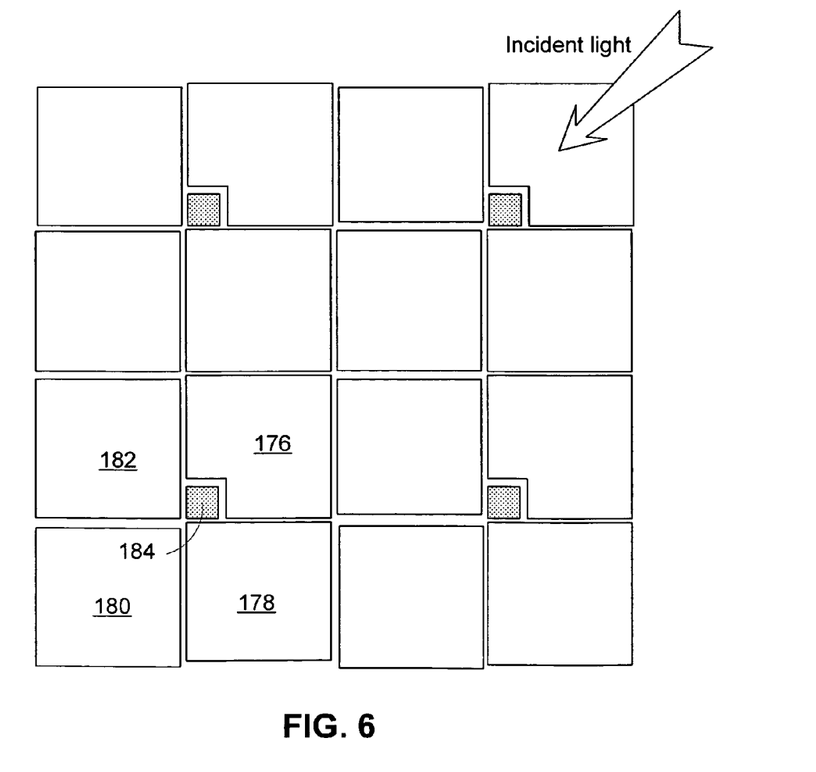
FIG. 6 illustrates a top view of a portion of another micromirror array of the spatial light modulator in FIG. 2.

Referring to FIG. 6, in accordance with an embodiment of the invention, micromirrors in the spatial light modulator are different. Specifically, only selected micromirrors are provide with posts that directly connect the micromirrors to the substrate. In accordance with an embodiment of the invention, one post is provided for every 4 (four) micromirrors. The hinge supports (e.g. hinge support 130 in FIG. 3) of the adjacent micromirrors are interconnected, forming one or more hinge support bridges across the micromirror array. Such hinge bridge(s) is held by the provided posts with each post directly connecting a hinge support to the substrate. As shown in FIG. 6, hinge supports of micromirrors 176, 178, 180, and 182 are interconnected. The deformable hinge of each of the micromirrors is held by a hinge support. However, only micromirror 176 is provided with post 184 that directly connects the hinge support of micromirror 176, thus the hinge support bridge (formed of the hinge supports of the four micromirrors) to the substrate (e.g. substrate 124 in FIG. 5). In other embodiments of the invention, the micromirror may have a lower density of posts. For example, a post is provided for every 6 or more, or 9 or more, or even larger number of micromirrors of the micromirror array. Because posts are only provided for selected micromirrors, those micromirrors without posts effectively have larger reflective surfaces than the micromirrors having posts. Such provision of posts of selected micromirrors in the micromirror array certainly has many advantages, such as a high fill factor that is measured by a ratio of the total reflective areas to the total areas of the array. However, undesired uneven illumination intensity effect may arise from the unequal reflective areas of the micromirrors. For example, because micromirror 176 has post 184 that reduces the reflective area of micromirror 176, the produced illumination intensity of corresponding image pixel will be different from those of micromirrors having no posts, such as micromirrors 178, 180, and 182. This problem can be solved or depressed by adjusting the reflective areas of the micromirrors having posts (e.g. the area of micromirror 176). In particular, the reflective area of mirror 176 can be enlarged by making a larger mirror plate of micromirror 176. As a consequence, the gap between micromirror 176 and adjacent micromirror 178 (and/or the gap between micromirror 176 and micromirror 182) is smaller than the gaps between micromirrors having no posts, such as the gap between micromirror 180 and 182. It is noted that the figure is drawn for illustrative purposes and is not in scale. In addition to the variation of the gap size, pitches of adjacent different micromirrors may or may not change. For example, the reflective areas of the micromirrors having posts can be expended with the center of each micromirror being fixed. In this way, the pitch of the micromirror array is maintained uniform. Alternatively, the centers of the reflective areas of the micromirrors can be displaced so as to reduce the gap size. In this way, the pitch is reduced. In yet another example, the reflective area of each of micromirrors having posts can be expanded not around the center of the micromirror. As a result, the centers of the micromirrors may be displaced. In any alternatives, the increased reflective areas compensate reduction of the reflective areas of the micromirrors having posts. The produced illumination intensities on the corresponding image pixels are uniform.

Figure 7:
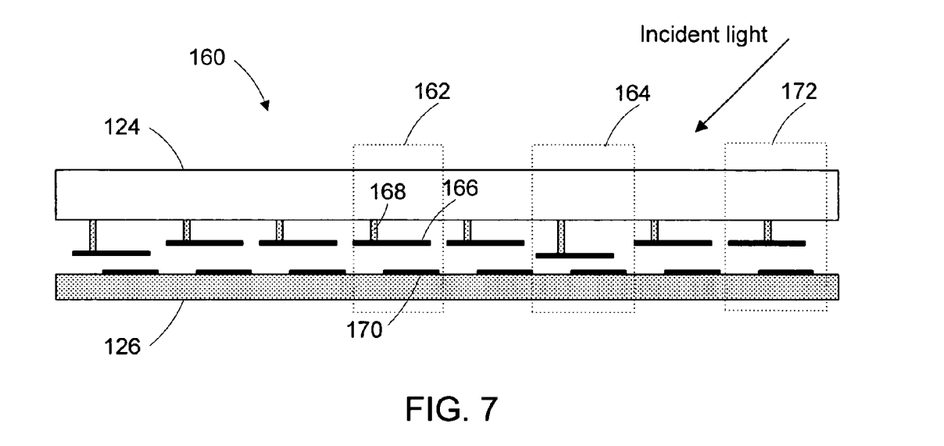
FIG. 7 is a cross-section view of a portion of the spatial light modulator in FIG. 2, wherein the mirror plates of the micromirror array have different vertical distance from the substrate on which the mirror plates are formed.

Other than forming the micromirror array with the reflective areas of the micromirrors in the same plane, the reflective areas can be on different planes, as illustrated in FIG. 7. Referring to FIG. 7, a cross-sectional view of a portion of a micromirror array is illustrated therein. Micromirror 160 comprises an array of micromirrors formed on substrate 124 that is preferably transmissive to visible light. Each micromirror comprises a deflectable reflective mirror plate (e.g. mirror plate 166 of micromirror 162) that is attached to a deformable hinge with the deformable hinge being connected to the substrate via post 168. For deflecting the mirror plates, an array of electrodes is provided with each electrode being associated with a mirror plate. For example, electrode 170 is positioned proximate to mirror plate 166 such that the mirror plate rotates relative to the substrate under an electrostatic force derived from an electrostatic field established between the mirror plate and electrode.

The reflective surfaces, however, may locate in different planes parallel to substrate 124 when the micromirrors are not deflected. For example, mirror plates of micromirrors 162 and 164 are at different vertical locations, or in other words, having different spaces from substrate 124. This particular geometric configuration can also be applied to compensate the undesired illumination variation resulted from the unequal reflective surfaces.

The micromirror array may also comprise different micromirrors, such as micromirror 172. As compared to micromirrors 162 and 164 whose mirror plates rotates asymmetrically with the mirror plates being attached to the hinge asymmetrically, micromirror 172 has a mirror plate that rotates symmetrically. Specifically, the mirror plate of micromirror 162 is operable to rotate to a larger angle (e.g. the ON state angle) in one direction than the angle (e.g. the OFF state angle) in the opposite direction. In contrast, the mirror plate of micromirror 172 rotates to the angles with the same absolute value in both directions.

Figure 8:
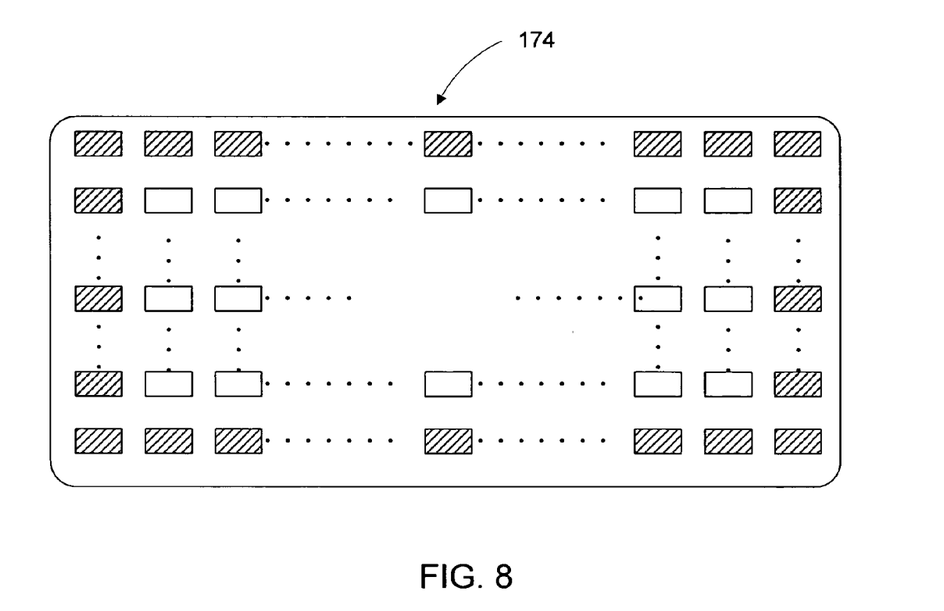
FIG. 8 is a top view of another exemplary spatial light modulator according to an embodiment of the invention.

Micromirrors which differ from one another may be arranged in groups of micromirrors with similar properties or more selectively with a view to a larger predefined pattern or objective. For example, a section of the micromirror array may comprise micromirrors with mirror plates having one property (i.e. diamond shape), and another section may comprise micromirrors with mirror plates having another property (i.e. square or round shape). Each section may further comprise micromirrors with yet another variation in one of its properties or in the relative location of its mirror plate. This could be applied with no limit placed upon the number of varying properties of the micromirrors and with no limit on the number of divisions of the micromirror array. This is one exemplary arrangement, but other arrangements or patterns are possible. For example, the micromirrors along the perimeter of a micromirror array, such as the shaded micromirrors in FIG. 8, may have different properties from micromirrors that are not along the perimeter as shown in FIG. 8. Furthermore, similar micromirrors need not be confined to any given section of a micromirror array. No clear groupings of a given property—no divisions—are necessary at all. Selected micromirrors or even adjacent micromirrors may feature aspects with different shapes or materials or other properties, or a combination thereof, one from the other. In accordance with yet another embodiment of the invention, the micromirror array comprises a first and second sub-array with micromirrors in different sub-arrays having different properties, and micromirrors in the same sub-array are the same. The total number of micromirrors in one sub-array may account for 90% or more, or 70% or more, or 50% or more of the total number of micromirrors in the array.

For a micromirror array with high uniformity, a monochromatic coherent light source, such as an arc lamp that is generally used in most current display systems may produce a diffraction pattern which conveys information regarding the underlying periodicity of the micromirror array. This undesired diffraction pattern overlaps with the displayed images, and can be perceived by viewers, resulting in unpleasant visual effect. To avoid or depress if not avoidable such undesired visual results, the placement of the micromirrors with varying properties is preferably neither in complete order across the entire array nor left in random in an embodiment of the invention. If the micromirrors of different properties are completely randomly arranged within the micromirror array, other undesired visual effects (e.g. viewer perception of the non-uniformity). The determination of where micromirrors with varying properties will be placed may be made based upon various factors. For example, in the example of the usage of a micromirror array in a spatial light modulator in a display system, some factors upon which placement may be based might be: the location of the reflected light of a given micromirror in the image itself (i.e. on the edges of a rectangular screen where some distortion is anticipated); the distance of the micromirror from the source of incident light; quantities of materials readily available; or cost of fabrication.

The micromirrors of a micromirror array device may also be different in other aspects, such as reflectivity to visible light. According to the present invention, a mirror may comprise a reflecting layer (e.g. a layer of aluminum (Al)) and an enhancing layer (e.g. a layer of silicon nitride). Other conductive and reflective materials or metals, metal alloys and metal compounds besides aluminum could be used for the reflecting layer, such as titanium (Ti), silver, gold, or an alloy or compound thereof. Other ceramics or materials besides silicon nitride could be used for the enhancing layer, such as silicon dioxide ($SiO_2$). Further, a mirror plate may comprise more than just two layers. A multi-layer arrangement with multiple layers of a reflective material and a ceramic, such as a silicon compound, could be used. To enhance the reflectivity of the mirror laminate, one or more dielectric films that act as a reflective coating may be deposited on the mirror laminate as well.

In accordance with an embodiment of the invention, all the mirror plates, of micromirrors in an array do not have to be formed of materials or arrangement of materials consistent with other mirror plates of micromirrors in the same array. That is, a micromirror array may contain micromirrors with mirrors plates differing in material, number of layers of a material, arrangement of said layers, or the thickness of layers, from other mirrors in the same array. For example, some mirror plates of micromirrors in a micromirror array may comprise one layer of Al and one layer of $SiO_2$ while other micromirrors in the same micromirror array may include mirror plates comprising a layer of Al sandwiched by two layers of $SiO_2$. These differ in arrangement of layers of Al and $SiO_2$. Yet other micromirrors in the same micromirror array may have mirror plates of altogether different materials such as Ti and $SiO_2$ or Ti and silicon nitride or may have the same materials but of different thickness. Some mirror plates of micromirrors in the array may also have a surface layer of dielectric films that act as a reflective coating.

In particular with respect to the reflective coating or the reflectivity of the mirror plates in general and the reflectivity of the materials thereof, the reflectivity of micromirrors in a micromirror array may be different from one another. Referring to FIG. 8, spatial light modulator 174 comprises an active area (non-shaded area) and an inactive area (shaded area). The micromirrors in the active area each corresponds to an image pixel that is viewed in a projection display (e.g. the active area pixels operates according to image data in a projection system), while the micromirrors in the inactive area do not. However, all micromirrors in both active and inactive regions can be deflectable. Specifically, each micromirror in the array comprises a reflective and deflectable mirror plate that is capable of rotating along a rotation axis to an angle, such as the ON and OFF state angle. However, it may be the case that the micromirrors (or pixels) in the inactive area are held in an OFF state while those in the active area are switched between the ON and OFF state. In particular, the micromirrors in the inactive area can be maintained at a non-electrostatically deflected state, in which state the mirror plates can be parallel to the substrate on which the micromirrors are formed, or naturally at an angle relative to the substrate.

In accordance with an embodiment of the invention, a lower reflectivity is desired along the perimeter of a micromirror array to reduce the amount of light scatter along the perimeter of a micromirror array. The micromirrors within the shaded area have lower reflectivity to visible light than those of the micromirrors in the non-shaded area. For example, the micromirrors in the shaded area may have a reflectivity of 99% or higher, or 90% or higher, while the mirrors along the perimeter of the array may have a reflectivity less than 40%, or less than 30%, or les than 10%, or even less than 1%. Such configuration may benefit the perceived contrast ratio.

The micromirror array of the present invention can be fabricated in many ways, as those set forth in U.S. patent application Ser. No. 10/366,297, filed Feb. 12, 2003 now U.S. Pat. No. 6,867,897; and U.S. Pat. No. 5,835,256, issued on Nov. 10, 1998, the subject matter of each being incorporated herein by reference. In fabricating the micromirrors of the micromirror array, a set of masks is prepared. Because the micromirror array comprises micromirrors of different properties, the masks are accordingly made such that the areas in the masks corresponding to the different micromirrors in the array are different.

The micromirrors of the micromirror array each may have multiple structural members, such as substrate(s), posts, a hinge support, a hinge, a mirror plate, and other alternative features such as stoppers for limiting rotation of the mirror plate, and anti-reflection coatings on the light transmissive substrate is provided. Each member however may have multiple layers. Specifically, the mirror plate may have a reflecting layer and an enhancing layer for enhancing the mechanical properties of the mirror plate. The hinge, as well as the hinge support can also be a multi-layered structure preferably comprising a conducting layer and a ceramic layer.

According to the invention, the micromirrors are formed on a light transmissive substrate such as glass or quartz. On the surface of the light transmissive substrate, an anti-reflection film can be deposited. The structural layer may comprise: elemental metals (e.g. Al, Au, Ti, Pt, and Cu) or metalloid (not Si, and Ge), metal alloys that comprises two or more elemental metals, intermetallic compounds, and ceramics (but not WN).

The intermetallic compound can be $Ti_xAl_y$, $Ni_xAl_y$, $Ti_x\-Ni_y$, $VAl_x$, $WTe_x$, $TiFe_x$, $TiPd_x$, $AlPd_x$, $MoPd_x$, $MoNi_x$, $MoFe_x$, $CoCr_x$, $CoMn_x$, $NiW_x$, $NiV_x$, $NiTi_xAl_y$, $NbAl_x$, $MoPd_x$, $AlCu_x$, $CuZn_x$, and $TaAl_x$. The intermetallic compound may be composed of a transition metal, especially an early transition metal. The early transition metals are those elements in the periodic table in columns 3 through 7, namely columns beginning with Sc, Ti, V, Cr, and Mn. Preferred are those elements in columns 4 through 6 (i.e. Ti, Zr, Hf, V, Nb, Ta, Cr, Mo, and W), and elements Tc and Re in column 7. However late transition metals in columns 8, 9 and 10 (e.g. Ru, Os, Rh, Ir, and Pt) may also be possible in the present invention. Other structural materials may comprise materials that are predominantly intermetallic compounds that are further strengthened by addition of one or more strengthen materials, such as O and N. In this situation, the structural material comprises at least 60 atomic % or more, or 80 atomic % or more, or 90 atomic % or more, or 95 atomic % or more of the intermetallic material.

A ceramic is a compound wherein a metal (or metalloid) is bounded to a non-metal. The ceramics for the microstructures comprise transition metal nitride (e.g. $TiN_x$, $TaN_x$ and $CrN_x$), transition metal oxide (e.g. $TiO_x$, $TaO_x$ and $CrO_x$), transition metal carbide (e.g. $WC_x$, $TiC_x$, $TaC_x$ and $CrC_x$), transition metal oxynitride (e.g. $TiO_xN_y$, and $TaO_xN_y$), transition metal silicon nitride (e.g. $TiSi_xN_y$, and $TaSi_xN_y$), transition metal silicon oxynitride (e.g. $TiSiO_xN_y$, and $TaSiO_xN_y$), metalloid nitride (e.g. $SiN_x$), metalloid oxide (e.g. $SiO_x$), metalloid carbide (e.g. $SiC_x$), metalloid oxynitride (e.g. $SiO_xN_y$) or other ternary and higher compounds.

In fabricating the structures of the micromirrors on the substrate, sacrificial materials, such as amorphous silicon, W and other suitable materials are used. When amorphous silicon is used as the sacrificial layer and deposited between structural layers, it may diffuse into some structural layers, such as aluminum. To avoid such diffusion, a barrier layer may be deposited between the sacrificial layer and the structural layers (e.g. aluminum layer) that suffer from diffusion of silicon. The barrier layers can be a layer to be removed with the sacrificial layers or a layer stays with the structure layers after removal of sacrificial materials.

In addition to amorphous silicon, the sacrificial material for the sacrificial layers can be selected from the group consisting of elemental early transition metal, metal alloy, metalloid, metal silicide and other suitable materials such as $WN_x$ and $TaN_x$. Preferred early transition metals are those elements in columns 4 through 6 (i.e. Ti, Zr, Hf, V, Nb, Ta, Cr, Mo and W). Exemplary metal alloys for the sacrificial layers are $W_xTa$, $W_xTi$, $W_xMo$ and $W_xCr$. Exemplary metalloids for the sacrificial layers are Si, Ge and SiGe. Exemplary metal suicides for the sacrificial layers are $WSi_x$, $TiSi_x$, $MoSi_x$, $ZrSi_x$, $CrSi_x$, $TaSi_x$ and $TiWSi_x$. Most preferred materials are Ti, Si, W, WN and compounds or alloys thereof.

After all structural layers are deposited and patterned according to the desired configuration, the sacrificial layers and the removable barrier layers are removed using a spontaneous vapor phase chemical etchant. According to the invention, the etchant is selected from a group comprising interhalogen (e.g. bromine trifluoride), noble gas halide (e.g. xenon difluoride) and HF, and more preferably xenon difluoride. It is further preferred that the chemical etchant is mixed with a diluent gas, which is preferably an inert gas selected from $N_2$, He, Ne, Ar, Kr, and Xe, and more preferably He and $N_2$, as set forth in U.S. patent application Ser. No. 09/427,841 to Patel, filed Oct. 26, 1999now U.S. Pat. No. 6,290,864; Ser. No. 09/649,569 to Patel, filed Aug. 28, 2000now U.S. Pat. No. 6,949,202; and Ser. No. 10/269,149 to Patel, filed Oct. 12, 2002, the subject matter of each being incorporated herein by reference.

It will be appreciated by those skilled in the art that a new micromirror array device has been described herein. In view of the many possible embodiments to which the principles of this invention may be applied, however, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Specifically, the present invention is applicable to other types of pixels, such as plasma cells in plasma displays, CCD arrays, and LCOS and LCD displays. For the LCD displays, the cells holding the liquid crystals may also change in many ways, such reflectivity, and transitivity. Therefore, the invention as described herein contemplates all such embodiments as may come within the scope of the following claims and equivalents thereof. In the following claims, only elements denoted by the words "means for" are intended to be interpreted as a means plus function claims under 35 U.S.C. § 112, paragraph 6.

We claim:

1. A spatial light modulator, comprising: a micromirror array comprising a set of micromirrors in an active region and a set of micromirrors in an inactive region, wherein the micromirrors in the active region correspond to viewed image pixels, while the micromirrors in the inactive region do not; and wherein the micromirrors in the active region comprise a first micromirror that is different from a second micromirror in the same active region.

2. The spatial light modulator of claim 1, wherein the first and second micromirrors each comprise a deflectable reflective mirror plate attached to a deformable hinge that is held by a hinge support on a substrate.

3. The spatial light modulator of claim 2, wherein the mirror plates of the first and second micromirrors are different.

4. The spatial light modulator of claim 3, wherein the mirror plates are different in shape.

5. The spatial light modulator of claim 3, wherein the minor plates are different in reflectivity to visible light.

6. The spatial light modulator of claim 3, wherein the mirror plates comprise different materials.

7. The spatial light modulator of claim 3, wherein the mirror plates each are a multilayered structure.

8. The spatial light modulator of claim 4, wherein one of the mirror plates has a diamond shape, while the other has a zigzagged edge.

9. The spatial light modulator of claim 3, wherein the mirror plates have different vertical distance from the substrate.

10. The spatial light modulator of claim 3, wherein the mirror plates are different in size.

11. The spatial light modulator of claim 3, wherein the first micromirror has a post that directly connects the hinge support of the first micromirror to the substrate, while the second micromirror does not.

12. The spatial light modulator of claim 11, wherein the hinge support of the second micromirror is connected to the hinge support of the first micromirror.

13. The spatial light modulator of claim 3, wherein the first and second micromirrors are not adjacent.

14. The spatial light modulator of claim 3, wherein the mirror plates of the first and second micromirrors have different maximum rotation angles in a rotation direction.

15. The spatial light modulator of claim 3, wherein the minor plate of the first micromirror is operable to rotate asymmetrically, while the mirror plate of the second micromirror is not.

16. The spatial light modulator of claim 3, wherein the mirror plates each comprise a reflecting layer composed of a metallic material.

17. The spatial light modulator of claim 16, wherein the metallic material is aluminum, titanium, silver, or gold.

18. The spatial light modulator of claim 3, wherein the micromirrors in the active region comprise a first sub-array and second sub-array of micromirrors, wherein the micromirrors in different sub-array have different properties.

19. The spatial light modulator of claim 18, wherein a total number of micromirrors in the first sub-array accounts far 90% or more of a total number of micromirrors in the active region.

20. The spatial light modulator of claim 18, wherein a total number of micromirrors in the first sub-array accounts for 70% or more of a total number of micromirrors in the active region.

21. The spatial light modulator of claim 18, wherein a total number of micromirrors in the first sub-array accounts for 50% or more of a total number of micromirrors in the active region.

22. The spatial light modulator of claim 18, wherein the micromirrors in the active region comprise a third micromirror that is different from both of the first and second micromirrors.

23. The spatial light modulator of claim 2, wherein the mirror plates and hinges are formed on different planes parallel to the substrate when the mirror plates are not deflected.

24. The spatial light modulator of claim 1, wherein the micromirrors in the active region comprise a first and second sub-array of micromirrors; wherein the first sub-array has a pitch different from a pitch of the second sub-may with the pitch being defined as a center-to-centre distance between adjacent micromirrors.

25. The spatial light modulator of claim 1, wherein the micromirrors in the active region comprise a first and second sub-array of micromirrors; wherein the first sub-array has a gap different from a gap of the second sub-array with the gap being defined as the shortest distance between adjacent micromirrors.

26. A display system, comprising: an illumination system providing an illumination light for the system; a spatial light modulator at claim 10; and an optical element directing the illumination light to and from the spatial light modulator.

27. A spatial light modulator, comprising:
an array of micromirrors in an active region and an inactive region, wherein the micromirrors in the active region each correspond to an image pixel;
wherein the active region comprises a first sub-array of micromirrors and a second sub-array of micromirrors, wherein the first and second sub-arrays are different in pitch or gap with the pitch being defined as a center-to-center distance between adjacent micromirrors; and the gap being defined as the shortest distance between two adjacent micromirrors.

28. The spatial light modulator of claim 27, wherein the micromirrors of the first sub-array each correspond to a visual image pixel, while the micromirrors of the second sub-array do not.

29. The spatial light modulator of claim 27, wherein the micromirrors of the first sub-array each correspond to an image pixel, while the micromirrors of the second sub-array do not.

30. The spatial light modulator of claim 27, wherein the first sub-array comprises a first micromirror and a different second micromirror.

31. The spatial light modulator of claim 30, wherein the first and second micromirrors each comprise a deflectable reflective mirror plate attached to a deformable hinge that is held by a hinge support on a substrate.

32. The spatial light modulator of claim 31, wherein the mirror plates are different in shape.

33. The spatial light modulator of claim 32, wherein one of the mirror plates has a diamond shape, while the other has a zigzagged edge.

34. The spatial light modulator of claim 31, wherein the mirror plates are different in reflectivity to visible light.

35. The spatial light modulator of claim 31, wherein the mirror plates comprise different materials.

36. The spatial light modulator of claim 31, wherein the mirror plates each are a multilayered structure.

37. The spatial light modulator of claim 31, wherein the mirror plates have different vertical distance from the substrate.

38. The spatial light modulator of claim 31, wherein the mirror plates and hinges are formed on different planes parallel to the substrate when the mirror plates are not deflected.

39. The spatial light modulator of claim 31, wherein the mirror plates are different in size.

40. The spatial light modulator of claim 31, wherein the first micromirror has a post that directly connects the hinge support of the first micromirror to the substrate, while the second micromirror does not.

41. The spatial light modulator of claim 40, wherein the hinge support of the second micromirror is connected to the hinge support of the first micromirror.

42. The spatial light modulator of claim 31, wherein the mirror plates of the first and second micromirrors have different maximum rotation angles in a rotation direction.

43. The spatial light modulator of claim 31, wherein the mirror plate of the first micromirror is operable to rotate asymmetrically, while the minor plate of the second micromirror is not.

44. The spatial light modulator of claim 31, wherein the mirror plates each comprise a reflecting layer composed of a metallic material.

45. The spatial light modulator of claim 31, wherein the mirror plate comprises a metallic material that is aluminum, titanium, silver, or gold.

46. The spatial light modulator of claim 30, wherein the first and second micromirrors are not adjacent.

47. The spatial light modulator of claim 27, wherein the micromirror array comprises an active region and an inactive region; wherein the micromirrors in the active region comprises a first sub-array and second sub-array of micromirrors, wherein the micromirrors in different sub-array have different properties.

48. The spatial light modulator of claim 47, wherein a total number of micromirrors in the first sub-array accounts for 90% or more of a total number of micromirrors in the active region.

49. The spatial light modulator of claim 47, wherein a total number of micromirrors in the first sub-array accounts for 70% or more of a total number of micromirrors in the active region.

50. The spatial light modulator of claim 47, wherein a total number of micromirrors in the first sub-array accounts for 50% or more of a total number of micromirrors in the active region.

51. The spatial light modulator of claim 47, wherein the micromirrors in the active region comprise a third micromirror that is different from both of the first and second micromirrors.

52. A display system, comprising: an illumination system providing an illumination light for the system; a spatial light modulator of claim 27; and an optical element directing the illumination light to and from the spatial light modulator.

53. A method of fabricating a micromirror array device, comprising:
 preparing a set of masks at least one of which having a first area corresponding to a first micromirror and a second area corresponding to a second micromirror, wherein the first and second areas are different;
 forming an array of micromirrors, comprising:
  providing a substrate;
  depositing a sacrificial material on the substrate; and
  forming a plurality of series of structural layers of the micromirrors, comprising:
   applying the set of masks such that at least two micromirrors in the array are different with each of the two different micromirrors being associated with an image pixel in operation; and
 removing the sacrificial material.

* * * * *